Patented Sept. 5, 1950

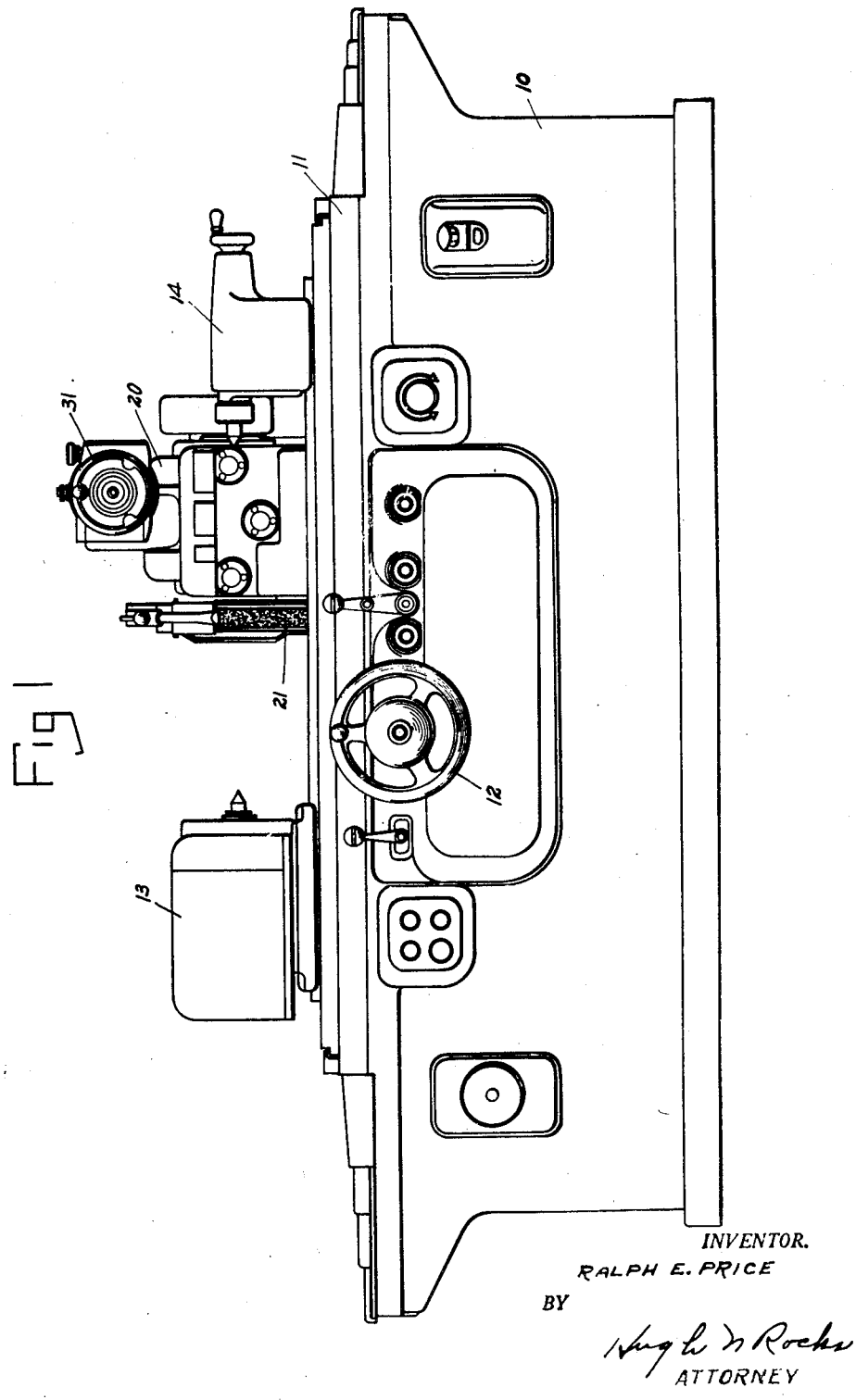

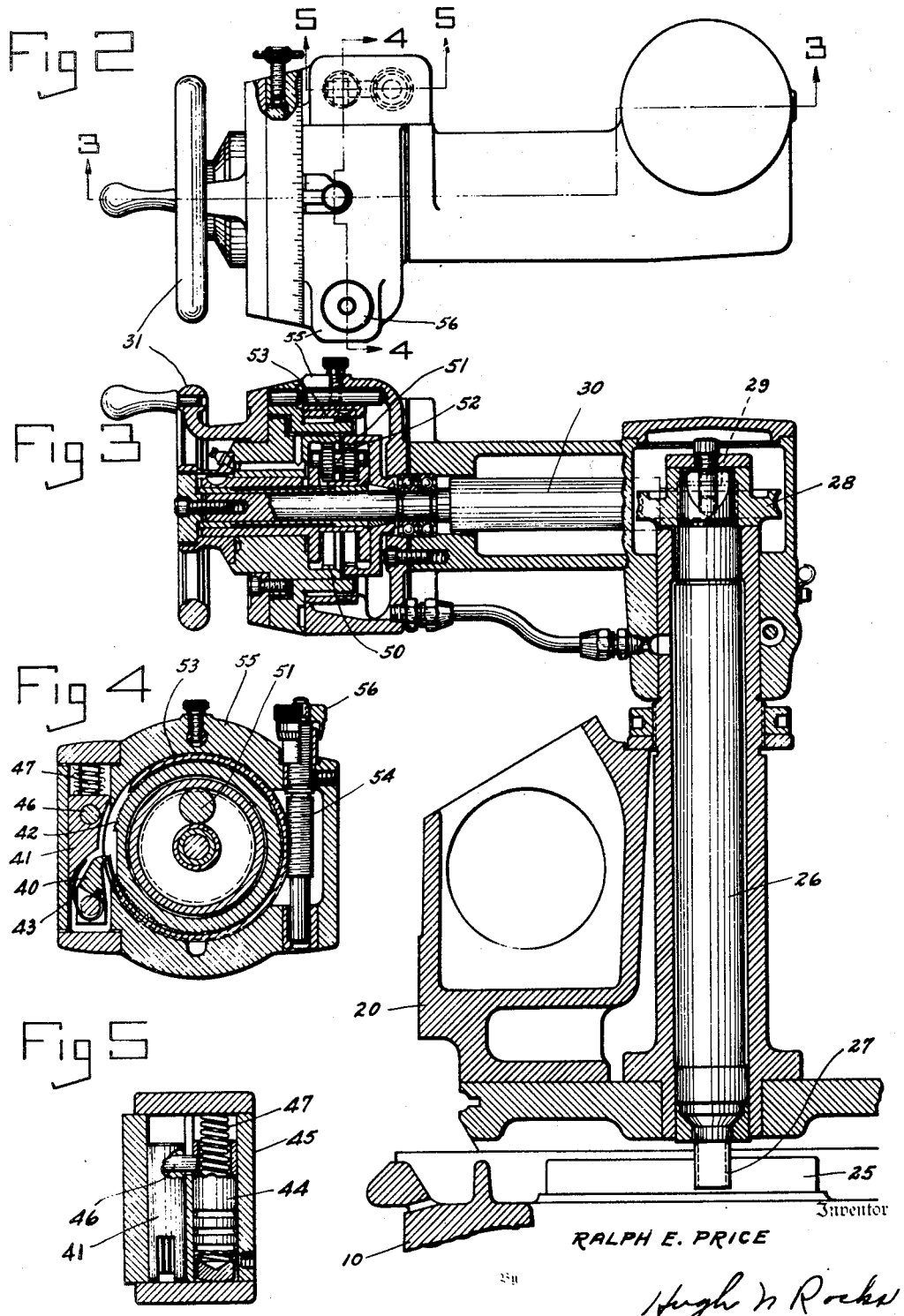

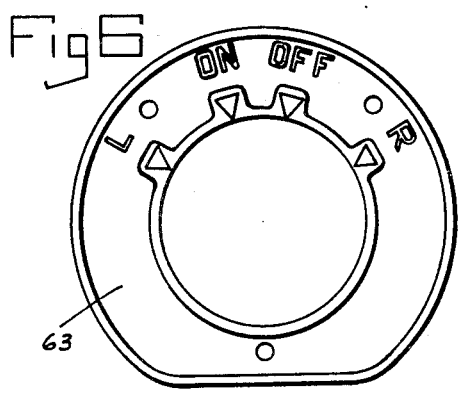
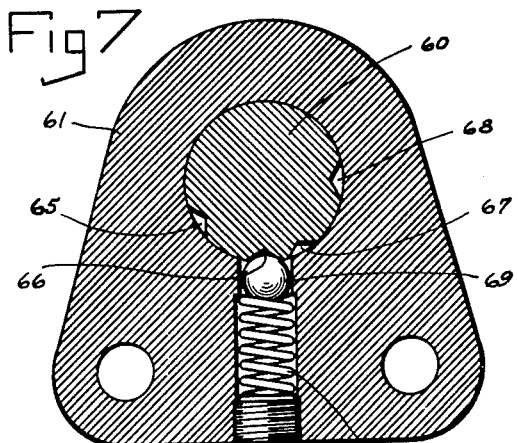
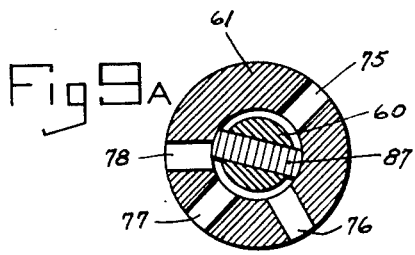
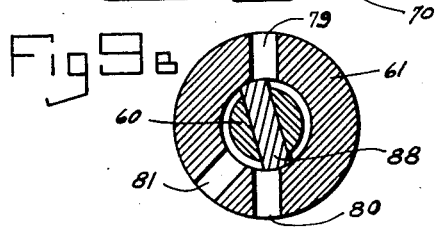
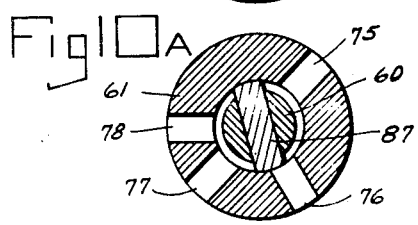
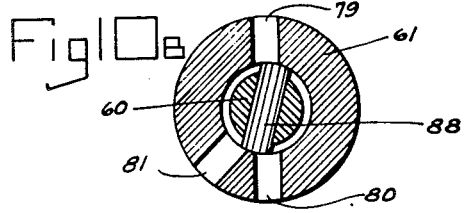
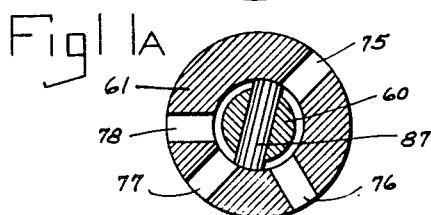
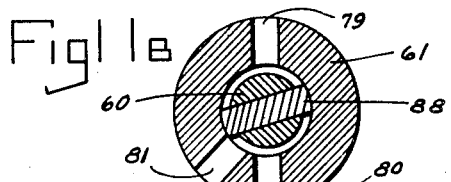
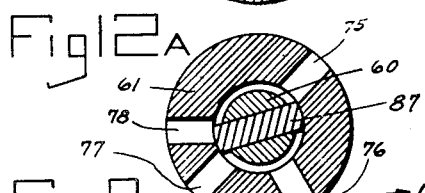
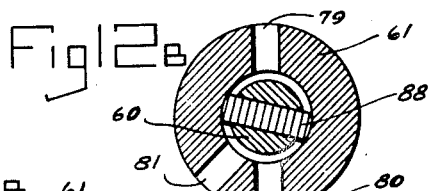
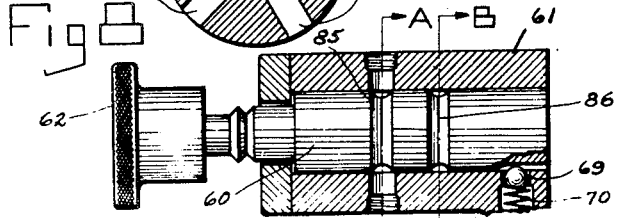

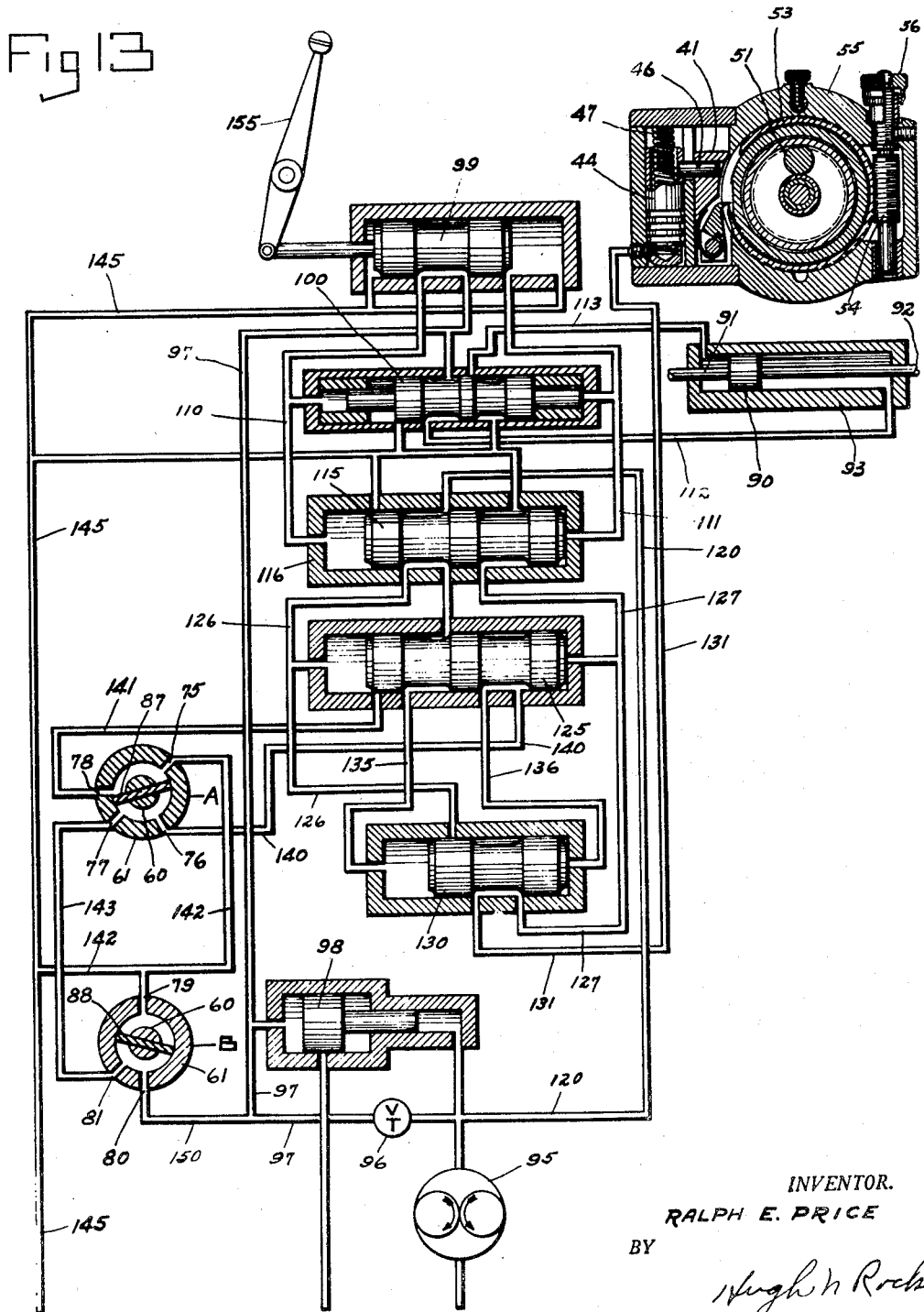

2,521,668

UNITED STATES PATENT OFFICE 2,521,668

HYDRAULIC SYSTEM FOR MACHINE TOOLS

Ralph E. Price, Highfield, Md., assignor to Landis Tool Company, Waynesboro, Pa.

Application September 12, 1946, Serial No. 696,448

10 Claims. (Cl. 51—2)

This invention relates to machine tools, particularly grinding machines and reversing and feed mechanisms for such machines.

There are several types of feed and traverse combinations in the prior art, in which the feed is actuated in some manner in timed relation with the reversal of the carriage. The actuation of the feed mechanism may occur just before the carriage stops or just after the carriage starts the return stroke, or it may occur during the interval between the end of one stroke and the beginning of the next.

This invention relates to a feed which is actuated during the interval when the carriage is at rest by the same mechanism which initiates traverse reversal. Previous devices of this type, even though hydraulically actuated, required mechanical elements such as cams between the reversing mechanism and the pawl and ratchet in order to provide a complete cycle of the pawl. Other hydraulically operated devices which sought to eliminate the mechanical elements used a pair of pistons operating at the same time but in opposite directions.

It is therefore an object of this invention to provide a full hydraulic feed and traverse mechanism wherein the feed mechanism is actuated by a single piston operated pawl.

A further object is to provide a hydraulic system actuated in timed relation with a reversing valve for connecting said pawl operating piston directly with a source of fluid under constant pressure and capable of supplying said fluid to said piston in excess of requirements thereof.

A further object is to provide in said hydraulic system a combination of valve mechanisms which will cause said feed piston to make a complete cycle of feed and reset, each time it is actuated.

A further object is to provide in said hydraulic system, a single selector valve for determining whether the feed mechanism is to be actuated at both ends of the traverse movement, at either end or not at all.

In the drawings:

Figure 1 is a front elevation of a conventional grinding machine.

Figure 2 is a plan view of the grinding wheel feed arm.

Figure 3 is an end elevation in section on lines 3—3 of Figure 2.

Figure 4 is a sectional front elevation on the line 4—4 of Figure 2.

Figure 5 is a sectional end elevation on the line 5—5 of Figure 2.

Figure 6 is a dial plate showing the several angular positions of the selector valve.

Figure 7 is a section through a portion of said valve showing the means for locating it in its several positions.

Figure 8 is a section through the selector valve.

Figures 9a and 9b are sectional views on the lines a—a and b—b of Figure 8 when said valve is in position to cause actuation of the wheel feed only at the left end of the traverse movement.

Figures 10a and 10b show the position of the valve when a feeding movement is desired at both ends of the traverse movement.

Figures 11a and 11b show the position of the valve when the feed movement is cut off at both ends.

Figures 12a and 12b show the position of the valve for feed at the right end only.

Figure 13 is a hydraulic diagram.

The machine shown in Figure 1 consists essentially of a bed 10 having a work carriage 11 slidable longitudinally thereof by means of suitable gearing including a hand wheel 12.

Work supporting means consists of a headstock 13 and footstock 14 mounted on said carriage. A grinding wheel base 20 is slidably mounted on said bed transversely of said work carriage. A grinding wheel 21 is rotatably supported on said base 20.

The means for feeding the grinding wheel 21 toward and from the work carriage 11 consists of a rack member 25 in bed 10, a vertical shaft 26 rotatably mounted in wheel base 20 and having a pinion 27 on one end for engaging said rack. The upper end of said vertical shaft has a worm wheel 28 mounted thereon. A worm gear 29 on a horizontal shaft 30 is suitably supported in operative engagement with said worm wheel. A hand wheel 31 operating through conventional gearing serves to turn said shafts and thus through the action of pinion 27 on rack 25 to feed said grinding wheel.

Figures 4 and 5 disclose a means for actuating the above described feed mechanism. Said means includes a conventional pawl and ratchet mechanism. The pawl 40 is pivotally mounted in a block 41 and urged toward the ratchet 42 by means of a spring 43. Said block 41 is attached to a piston 44 in an adjoining cylinder 45 by means of a pin 46. A spring 47 resists movement of piston 44 and urges said piston to a position to hold pawl 40 out of engagement with ratchet 42. Ratchet 42 is attached directly to handwheel 31. Said hand wheel is mounted for free rotation on shaft 30 and drives said shaft through a conventional gearing arrangement consisting of an internal gear 50 engaging one of a pair of differential pinions 51. The second pinion engages a second internal gear 52 which is keyed to shaft 30.

The amount of the feed increment of the pawl and ratchet mechanism is controlled by a shield 53 which encircles the ratchet. Said shield has worm wheel teeth therein for engagement with adjusting screw 54. Said screw is rotatably mounted in hand wheel housing 55. A micrometer adjusting means 56 for said screw provides accurate adjustment of the shield 53.

The selector valve 60 is shown in Figures 6-12 inclusive. Said valve is rotatably mounted in a housing 61 and is actuated by means of a knob 62. The various positions of the knob are indicated on a dial plate 63 (Figure 6). The various positions of said valve are determined by notches 65, 66, 67 and 68 about the surface thereof. A ball 69 urged by spring 70 engages said notches when said valve is turned.

Valve 60 has two sets of ports spaced axially in the housing 61. The section on line a—a has four ports 75, 76, 77, and 78. The section on b—b has three ports 79, 80 and 81. The valve has two grooves 85 and 86 spaced axially to correspond with the axial spacing of the two sets of ports. Pins 87 and 88 pass through said valve in each of said grooves respectively and serve to direct fluid under pressure through various combinations of said ports.

The hydraulic system of my invention includes a traverse motor consisting of a piston 90 having rods 91 and 92 for attaching to carriage 11 for traversing same. Said piston is slidably mounted in a cylinder 93. Fluid under pressure for actuating said piston is supplied by a pump 95 which supplies said fluid through a throttle valve 96 in line 97 and in parallel arrangement with a pressure operated relief valve 98. Line 97 conducts fluid to a pilot valve 99 and a reversing valve 100. Said fluid is directed by said pilot valve alternately through lines 110 and 111 to opposite ends of reversing valve 100 to shift said valve to one side or the other to direct fluid from line 97 alternately through lines 112 and 113 to opposite sides of cylinder 93.

Pilot valve 99 also directs fluid from line 97 through lines 110 and 111 to opposite ends of a feed control valve 115 in housing 116. Said feed control valve receives fluid under pressure from pump 95 through an unrestricted line 120 at a higher pressure than that passing through line 97. The pressure in these lines is dependent upon the areas of the respective ends of relief valve 98. A portion of said higher pressure fluid passes on through valve 115 to a second feed control valve 125. Valve 115 directs fluid under pressure from line 120 alternately through lines 126 and 127 to opposite ends of valve 125 and also through lines 126 and 127 to provide a supply of fluid to a shuttle valve 130 which directs said fluid intermittently through line 131 to actuate the feed mechanism described above. Valve 125 directs fluid from line 120 alternately through lines 135 and 136 to opposite ends of shuttle valve 130.

Selector valve 60 is connected to feed control valve 125 through ports 76 and 78 and lines 140 and 141 respectively. Ports 75 and 77 in the a section of said valve are connected through lines 142 and 143 respectively to ports 79 and 81 in the b section of said valve. Line 142 is an exhaust passage connected to the main exhaust line 145. Port 80 of the b section is connected to pressure line 97 through line 150.

Operation

In the position of the pilot valve 99 and the selector valve 60 shown in Figure 13 and in Figures 12a and 12b, said pilot valve directs fluid under pressure from line 97 through line 110 to shift reversing valve 100 to the right. At the same time said valve connects line 111 with exhaust line 145. Said fluid under pressure in line 110 also shifts feed control valve 115 to the right.

When reversing valve 100 is shifted to the right, fluid under pressure from line 97 will be directed through line 112 to the right end of cylinder 93 to cause piston 90 and the carriage to move to the left.

Feed control valve 115 will shift to the right simultaneously with reversing valve 100. In this position, valve 115 which receives fluid under the higher pressure from line 120 directs said fluid through line 126 to shift feed control valve 125 to the right and also directs fluid through said line to supply the shuttle valve 130.

In both positions of valve 115, line 120 is connected to valve 125 for distribution thereby. Valve 125, when shifted to the right directs fluid under the higher pressure through line 135 to the left end of shuttle valve 130. The opposite end of shuttle valve 130 is connected through line 136 and valve 125 to line 140. Line 140 is connected with port 76 in the a section of selector valve 60. With valve 60 in the position shown in Figure 13, port 76 is connected with port 77 and line 143 to port 81 in the b section of said valve. Port 81 is connected to port 80 which receives fluid under the lower pressure through line 150 from line 97. Thus, fluid under the lower pressure acts through line 136 to hold shuttle valve 130 in the left hand position. In this position line 126 carrying fluid under the higher pressure is connected with line 131 leading to feed piston 44. The valve 130 is held in left hand position by the low pressure fluid from the selector valve. The high pressure fluid from valve 115 is divided between the lines 126 or 127 leading through shuttle valve 130 to the feed mechanism cylinder 45, and line 135 leading to the left hand end of shuttle valve 130. Valve 130 is thus being held in the left hand position by the lower pressure fluid, which is greater than that required to move piston 44. Therefore piston 44 in cylinder 45 will move pawl 40 to give a slight feed movement to wheel base 20. When piston 44 reaches the end of its movement the pressure on the fluid increases and an increase in pressure occurs back through line 131, valve 130, line 126 to valve 115 where it is further backed through line 120, valve 125 and line 135 to shift valve 130 against the lower pressure.

When the shuttle valve has shifted to the right hand position, line 131 is connected first through said valve, line 127 to valve 115 which is in position to direct said fluid to exhaust line 145, so that spring 47 can reset piston 44 in preparation for the next feed increment.

When carriage 11 reaches the end of its stroke, one of the reversing dogs engages and shifts lever 155 to the left and pilot valve 99 to the right, fluid from low pressure supply line 97 will be directed through line 111 to shift reversing valve 100 and feed control valve 115 to the left. The reversing valve will direct fluid from line 97 through line 113 to cause piston 90 and carriage 11 to move to the right.

Valve 115 in the left hand position will direct fluid from the high pressure line 120 to line 127 to shift feed control valve 125 to the left and also to conduct said fluid through valve 130 and line 131 to feed piston 41 unless valve 130 is shifted too quickly to permit fluid to pass to piston 44.

When feed control valve 125 moves to the left it connects the high pressure line from valve 115 and line 120 with line 136 leading to the right end of shuttle valve 130. The left end of valve 130 will be connected through line 135, valve 125 and line 141 to port 78 of the *a* section of selector valve 60. Port 78 is connected through the valve to port 75 which in turn is connected through line 142 to exhaust line 145. Thus there is no pressure at the left end of valve 130 to delay shifting to the left hand position and said valve is shifted instantly. In the left hand position of valve 130, line 131 leading to the feed piston 44 is connected through line 126 and valve 115 to exhaust line 145. Thus, piston 44 remains in reset position and no feed occurs at the left end of the carriage stroke. If selector valve 60 is shifted to the position shown in Figures 9*a* and 9*b* the feed will occur at the left end of the carriage stroke but not at the right end. Valve 60 in this position simply reverses the exhaust connection of port 75 and the pressure connection of port 77 to opposite ends of feed control valve 125.

In the position of valve 60 shown in Figures 10*a* and 10*b*, both of the lines 140 and 141 leading through valve 125 and lines 135 and 136 to the ends of shuttle valve 130 are connected to exhaust. Line 140 is connected through ports 76 and 75 to exhaust lines 142 and 145. Line 141 is connected through ports 78 and 77 in section *a* and line 143 to port 81 in section *b*. Port 81 is connected through port 79 to exhaust lines 142 and 145. A feed movement is effected only when the shifting of shuttle valve 130 is delayed. In this case, at each reversal valve 125 connects one end or the other of shuttle valve 130 to the exhaust. This connection is made through selector valve 60.

If in the right hand position of valve 125, selector valve 60 is set to correct the right hand end of valve 130 with the low pressure fluid from line 97, the feed mechanism will be actuated at the left hand end of the traverse movement and vice versa. If valve 60 is set to connect both ends of valve 130 with low pressure fluid, feed will occur at both ends of traverse. If valve 60 is set to connect both ends of valve 130 to exhaust, the shuttle valve 130 will be shifted at each reversal of the carriage before the feed mechanism can be actuated.

I claim:

1. A hydraulic system for machine tools including a work traverse mechanism, a reversing mechanism for said traverse mechanism, and a tool feed mechanism, means responsive to operation of said reversing mechanism to set in operation means for actuating said feed mechanism including a shuttle valve, a selector valve for determining the action of said shuttle valve, said selector valve having axially spaced sections, one of said sections having ports connected thru said control valve to each end of said shuttle valve, other ports in said section being connected to another of said sections, and a port in said other section for receiving fluid under pressure, the valve member in said other section serving to connect one of the ports in said first section with an exhaust passage or with said fluid under pressure.

2. A hydraulic system for machine tools including a supply of fluid under pressure, a work traverse mechanism, a reversing mechanism for said traverse mechanism, and a tool feed mechanism, means responsive to operation of said reversing mechanism to set in operation means for actuating said feed mechanism including a shuttle valve for connecting said feed mechanism with a pressure or an exhaust line, a selector valve for determining the action of said shuttle valve, said selector valve having two axially spaced sections, one of said sections having ports connected with the shuttle valve, the other section having ports for connecting the first section with either an exhaust passage to permit a quick shift of said shuttle valve which prevents operation of said feed mechanism or with said fluid pressure supply so that fluid under pressure may be directed to said feed mechanism.

3. A hydraulic system for machine tools including a work traverse mechanism, a reversing mechanism for said traverse mechanism, and a tool feed mechanism, means responsive to operation of said reversing mechanism to set in operation means for actuating said feed mechanism including a shuttle valve, a selector valve for determining the action of said shuttle valve, said selector valve having two axially spaced sections, one of said sections having ports connected with the shuttle valve, the other section having ports for connecting the first section with either an exhaust passage or a pressure line, passages connecting said sections, one of said passages being connected at all times to said exhaust passage, another of said passages being connected alternately to said exhaust line and said pressure line.

4. A hydraulic system for machine tools including a work traverse mechanism, a reversing mechanism for said traverse mechanism, and a tool feed mechanism, means responsive to operation of said reversing mechanism to set in operation means for actuating said feed mechanism including a shuttle valve, a selector valve for determining the action of said shuttle valve, a pump, a divided conduit from said pump, one branch passing directly to a distributing valve the other passing through a restricted passage or throttle valve, a differential piston type pressure operated relief valve in said system, the pressure of the fluid on opposite sides of said throttle valve in said branches being proportional to the corresponding areas of said relief valve, and means to apply fluid under a different pressure to the shuttle valve and the grinding wheel feed mechanism than that used on the other parts of the system.

5. A hydraulic system for machine tools including a work traverse mechanism, a reversing mechanism for said traverse mechanism, and a tool feed mechanism, means responsive to operation of said reversing mechanism to set in operation means for actuating said feed mechanism including a shuttle valve, a selector valve for determining the action of said shuttle valve, a pump, a divided conduit from said pump, one branch passing directly to a distributing valve the other passing through a restricted passage or throttle valve, a differential piston type pressure operated relief valve in said system, the pressure of the fluid on opposite sides of said throttle valve in said branches being proportional to the corresponding areas of said relief valve, and means for directing the lower pressure to one end of said shuttle valve to delay shifting of said shuttle valve.

6. A hydraulic system for machine tools including a supply of fluid under pressure, a work traverse mechanism, a reversing mechanism for said traverse mechanism, and a tool feed mechanism, means responsive to operation of said reversing mechanism to set in operation means for actuating said feed mechanism including a shuttle valve, a selector valve for determining the action of said shuttle valve, said selector value being effective in one position to direct fluid under pressure for holding said shuttle valve in a position to direct fluid under pressure to actuate said feed mechanism, the pressure built up in the supply to said feed mechanism after said feed mechanism has functioned being effective to shift said shuttle valve against said holding means to a position to connect said feed mechanism with an exhaust passage whereby to permit a reset of said feed mechanism.

7. A hydraulic system for machine tools including a source of fluid under pressure, a work traverse mechanism, a reversing mechanism for said traverse mechanism, and a tool feed mechanism, means responsive to operation of said reversing mechanism to set in operation means for actuating said feed mechanism including a shuttle valve, a selector valve for determining the action of said shuttle valve, said selector valve having means for connecting the exhaust from one side or the other, or both sides of said shuttle valve to an exhaust passage and the opposite side to said fluid supply so that said shuttle valve is shifted before sufficient fluid under pressure can pass therethrough to cause a feed movement.

8. In a hydraulic system a traverse motor, a feed motor, control devices for said motors, a pump, a divided conduit from said pump, one branch passing directly to a distributing valve the other passing through a restricted passage or throttle valve, a differential piston type pressure operated relief valve in said system, the pressure of the fluid on opposite sides of said throttle valve being proportional to the corresponding areas of said relief valve and means for directing fluid under one pressure to some of said control devices and under another pressure to other of said control devices.

9. A hydraulic system for machine tools including a supply of fluid under relatively high pressure and a supply of fluid under relatively low pressure, a traverse mechanism, a reversing mechanism for said traverse mechanism, and a feed mechanism, means responsive to operation of said reversing mechanism to set in operation means for actuating said feed mechanism including a shuttle valve for directing fluid to said feed mechanism, means for effecting actuation of said feed mechanism at each reversal or at either reversal or for preventing operation of said feed mechanism at each reversal including a feed control valve arranged to connect each end of the shuttle valve alternately with the high pressure supply for shifting said shuttle valve, and the other end with a selector valve, said selector valve being operable to connect said feed control valve either to an exhaust line to permit instant shifting and thus preventing actuation of the feed or to said low pressure fluid supply to resist shifting said shuttle valve until fluid from the high pressure supply passing through the shuttle valve has caused said piston to complete its stroke.

10. A hydraulic system for machine tools including a supply of fluid under relatively high pressure and a supply of fluid under relatively low pressure, a traverse mechanism, a reversing mechanism for said traverse mechanism, and a feed mechanism, means responsive to operation of said reversing mechanism to set in operation means for actuating said feed mechanism including a shuttle valve for directing fluid to said feed mechanism, means for effecting actuation of said feed mechanism at each reversal or at either reversal or for preventing operation of said feed mechanism at each reversal including a feed control valve arranged to connect each end of the shuttle valve alternately with the high pressure supply for shifting said shuttle valve, and with a selector valve, said selector valve being operable to connect said feed control valve either to an exhaust line to permit instant shifting of said shuttle valve and thus preventing actuation of the feed or to said low pressure fluid supply to resist shifting said shuttle valve until it has directed fluid to actuate said feed.

RALPH E. PRICE.

REFERENCES CITED

The following references are of record in the file of this patent:

UNITED STATES PATENTS

| Number | Name | Date |
|---|---|---|
| 1,938,760 | Fritschi | Dec. 12, 1933 |
| 1,965,696 | Ferris et al. | July 10, 1934 |
| 1,978,181 | Whittles | Oct. 23, 1934 |
| 2,163,246 | Maglott | June 20, 1939 |
| 2,205,373 | Decker | June 18, 1940 |
| 2,294,872 | Wood | Sept. 1, 1942 |
| 2,378,066 | DeYoung | June 12, 1945 |